Figure 1:
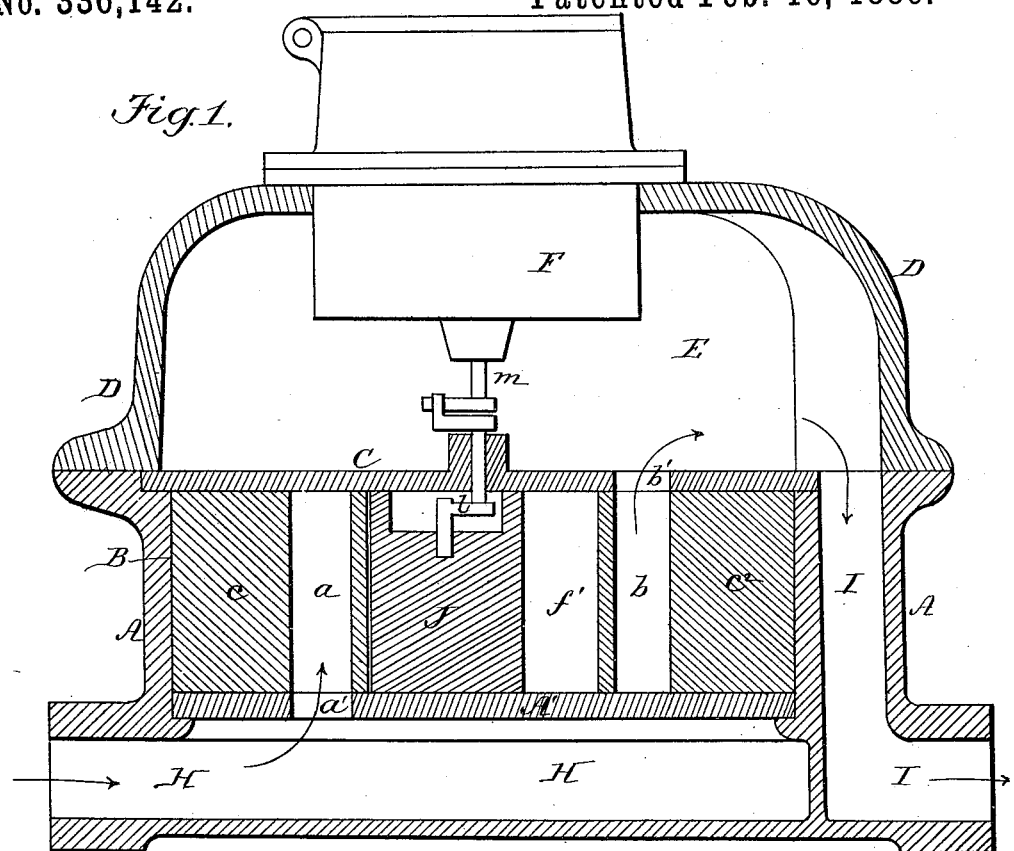

(No Model.) 3 Sheets—Sheet 1.

L. H. NASH.
WATER METER WITH REVOLVING PISTON.

No. 336,142. Patented Feb. 16, 1886.

WITNESSES

INVENTOR
Lewis Hallock Nash
by Johnson and Johnson
Attorneys.

(No Model.) 3 Sheets—Sheet 2.

L. H. NASH.
WATER METER WITH REVOLVING PISTON.

No. 336,142. Patented Feb. 16, 1886.

WITNESSES

INVENTOR
Lewis Hallock Nash
by Johnson and Johnson
Attorneys.

(No Model.) 3 Sheets—Sheet 3.

L. H. NASH.
WATER METER WITH REVOLVING PISTON.

No. 336,142. Patented Feb. 16, 1886.

WITNESSES

INVENTOR
Lewis Hallock Nash
by Johnson and Johnson
Attorneys.

UNITED STATES PATENT OFFICE.

LEWIS HALLOCK NASH, OF BROOKLYN, ASSIGNOR TO THE NATIONAL METER COMPANY, OF NEW YORK, N. Y.

WATER-METER WITH REVOLVING PISTON.

SPECIFICATION forming part of Letters Patent No. 336,142, dated February 16, 1886.

Application filed October 16, 1885. Serial No. 180,083. (No model.)

*To all whom it may concern:*

Be it known that I, LEWIS HALLOCK NASH, a citizen of the United States, residing at Brooklyn, in the county of Kings and State of New York, have invented new and useful Improvements in Water-Meters, of which the following is a specification.

My improvement relates to that class of meters in which a piston having alternate projections and recesses has an eccentric movement about the center of a case having corresponding recesses and projections, and the device belongs to that class of meters in which the number of projections upon the piston is equal to the number of recesses upon the case. In such construction the piston itself does not rotate upon its axis, but has a revolving non-rotating movement within its case, and in such movement each piston projection serves to displace a quantity of water from the corresponding case-recesses, while the case projections operate to displace a quantity of water from corresponding recesses within the piston. Each case-recess is provided with a corresponding inlet and discharge port, which, in the operation of the piston, have alternate connections with the enlarging and contracting spaces of the case and piston recess-spaces.

I am aware that the meter herein shown and described is broadly old as to the matters stated; but I have found in practice that it is a matter of vital importance in a water-meter of this class that all the enlarging and contracting spaces must be so arranged that there shall be no resistance to the inflow and escape of the water into and from the said spaces, and also that there shall be no dead-spaces into and from which there is no communication, which would thereby cause a lock upon the movement of the piston. Since it is necessary that the piston should move with perfect freedom in order to accurately measure the water, any such dead-spaces will render the measuring action of the device defective or worthless. My invention is therefore directed to providing for free and ample supply of water to all of the enlarging and contracting spaces, and in so forming the piston and case projections that there shall be no spaces into which the water does not have free access and outlet as soon as the said space begins to change its volume—that is to say, I so form the ports, the piston, and case projections that the water will have free inlet and outlet at every changing space, as will be hereinafter specifically described and claimed.

Figure 2:
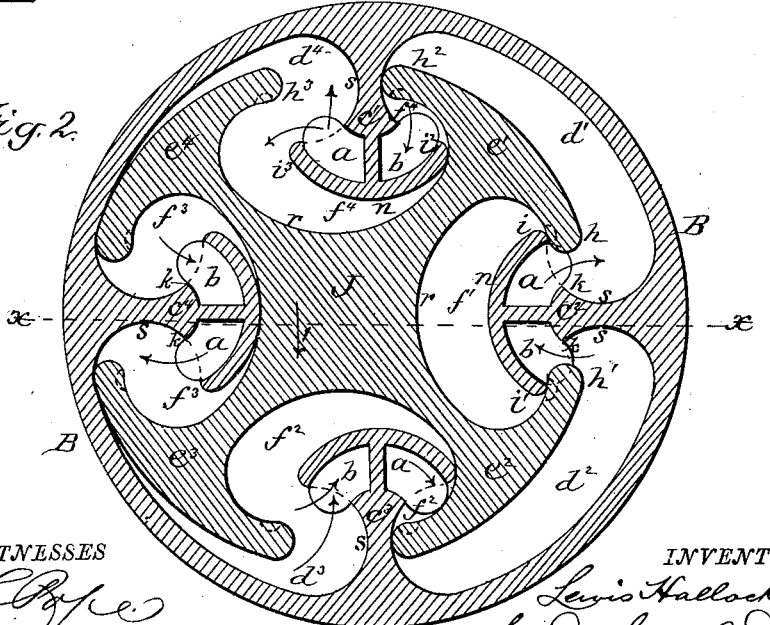

Referring to the drawings, Figure 1 represents a vertical section of a meter, taken on the line $x\ x$ of Fig. 2, embracing my improvements. Figs. 2, 3, 4, and 5 are horizontal sections through the meter, showing the piston in different positions of its movement, and the manner in which the piston operates in relation to the ports.

An inclosing-case, A, has a cylinder, B, which forms the inner bearing for the piston, the lower head of which cylinder is formed by the plate A' of the case, and the upper cylinder-head, C, is formed of a separate plate. The case has a cover, D, which incloses the outlet-chamber E, and in which is placed the indicating mechanism inclosed in the box F. The case is provided with an inlet-passage, H, which communicates with the supply-ports $a$ of the bearing-cylinder B through openings $a'$ in the bottom head, A', and an outlet-passage, I, leading from the chamber E, which has free communication with the outlet-ports $b$ of said cylinder through openings $b'$ in the top plate, C.

The bearing-cylinder B is formed with projections $c'$, $c^2$, $c^3$, and $c^4$, which contain the inlet-ports $a$ and the discharge-ports $b$, and between these case projections are formed the chamber-recesses $d'\ d^2\ d^3\ d^4$. These projections stand radial from the inner-case wall, and terminate in bearing ends $i\ i'$, &c., which are joined by a convex bearing-surface, $n$, while the inner walls of the projection ends form the ports.

The piston J is formed with projections $e'$, $e^2$, $e^3$, and $e^4$, which are of such shape as always to make joint-forming contact with the corresponding case-recesses, and between these piston projections are formed therein recesses $f'\ f^2\ f^3\ f^4$, of such shape as to make contact with the case projections $c'\ c^2$, &c., and be divided thereby into receiving and discharging spaces. These piston projections are made convex on their outer faces, and terminate in convex bearing ends $h\ h'$, &c., while the recesses $f f'$ have concave walls $r$, corresponding to the bearing-surfaces $n$.

In order to prevent dead-chambers and the suction caused by contact of the piston at two points inclosing a dead-space, the ends of the cylinder bearing projections $c'$ $c^2$ $c^3$, &c., are of convex surfaces, terminating on each side in end bearing-points $i$ $i'$, &c., and the corresponding parts of the piston-recess $r$ of concave form, whereby in the movement of the piston the said surfaces make contact on a line only to effect the division of the piston-recesses into increasing and diminishing spaces, and thereby prevent the friction and suction caused by large sliding surfaces under water. The piston-projection points $h$ are also formed convex, and the corresponding portions of the cylinder projections $s$ are formed concave, for the same reason.

Figure 3:
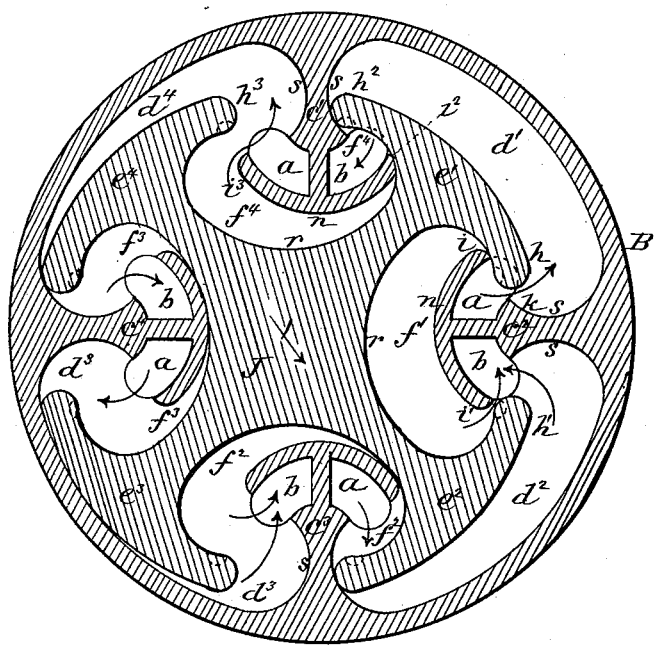
Figure 4:
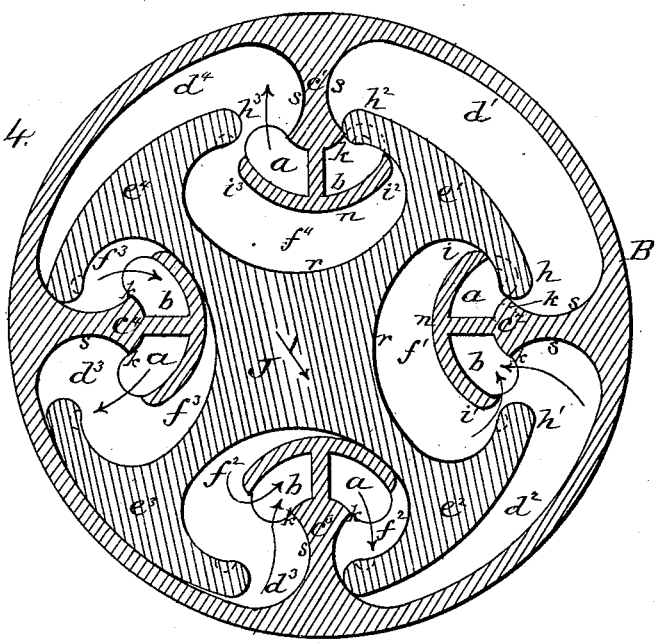
Figure 5:
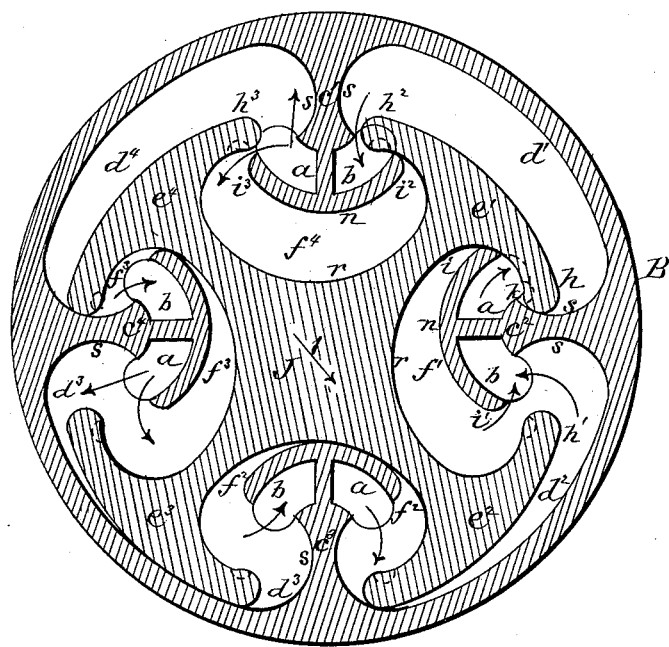

An important feature of my invention relates to the location of the acting edges of the points $a$ and $b$, which are determined by the following conditions: When any piston-chamber, as $f'$, is at its greatest capacity, as shown in Fig. 2, the bearing ends $h$ and $h'$ of the piston-points, which inclose said piston-chamber, should be in contact with the bearing ends $i$ $i'$ of the corresponding cylinder projections. These bearing ends $h$ $h'$ $i$ $i'$ are so formed and relatively located that any movement of the piston will instantly break contact between two of these points before the chamber $f'$ has begun perceptibly to change its volume, as shown in Fig. 3, by which construction an instant escape is provided for the water, as shown by the arrow, while the said chamber is decreasing its volume by means of the motion of the piston upon the point entering said piston-recess. If any piston-chamber, as $f^4$, Fig. 5, is enlarging and nearly at its greatest dimensions, the point $h^3$ is rapidly approaching its corresponding cylinder bearing-point $i^3$, and these two points should be so formed and placed that contact is made between them just at the instant that the opposite bearing-points of the said chamber are on the point of separating. Thus the proper inlet and discharge of the water to and from the piston measuring-spaces is effected by forming the bearing ends of the cylinder and piston points so that the first pair of these piston points make contact at the instant the other pair are about to break contact. In order to render this making and breaking contact more abrupt, I may remove a portion of the bearing ends of the piston, as shown by dotted lines in the points $h$ $h'$, &c. Again, in relation to the cylinder-spaces $d'$ $d^2$, &c., if any one of them, as $d'$, Fig. 4, is at its greatest capacity, the bearing ends $h$ $h^2$, the piston points make contact with the cylinder-points $c^2$ $c'$, and the ports $a$ and $b$ are formed so that the point $h$ has just closed the edge $k$ of the port $a$, and the port $h^2$ is just on the instant of opening the port $b$, so that in the movement of the piston to and from the position of Fig. 4 the water has free communication to the space $d'$, as in Fig. 3, until the instant the piston has arrived at the position of Fig. 4, and the slightest further movement of the piston opens communication between chamber $d'$ and the discharge-port $b$, as in Fig. 5. Thus the proper admission and discharge of the water to and into the cylinder-chambers $d'$ $d^2$, &c., are controlled by the relative positions of the port-edges $k$ and of the bearing ends $h$ $h'$, &c., of the piston-points whereby the contact is made by the one point at the instant it is broken by the other.

The operation is as follows: Water enters the passage H into the ports $a$, and from which it passes into the measuring-chambers in the operation of the piston. At the same time it escapes through the ports $b$ into chamber E and out at passage I. The piston being in position, Fig. 2, water enters chambers $d'$, $d^4$, $f^4$, $f^2$, and $f^3$ through the ports $a$, as shown by the arrows, and escapes from chambers $d^2$, $f^2$, $d^3$, $f^3$, and $f^4$, as shown by the arrows, through the ports $b$, driving the piston in the direction of the arrow 1 into the position in Fig. 3, at which time the water enters chambers $d'$, $d^4$, $f^4$, $f^3$, $d^2$, and $f^2$, as shown by the arrows, and escapes from chambers $f^4$, $f^3$, $f^2$, $d^3$, $d^2$, and $f'$, as shown by the arrows, driving the piston in the direction of the arrow 1 into the position of Fig. 4. At this time communication is closed with chamber $d'$, and water enters chambers $f^4$, $d^4$, $f^3$, $d^3$, and $f^2$, and escapes from chambers $f^3$, $f^2$, $d^3$, $d^2$, and $f'$, as shown by the arrows, driving the piston in the direction of arrow 1 to the position in Fig. 5, at which time water enters chambers $d^4$, $f^4$, $d^3$, $f^3$, and $f^2$, and escapes from chambers $d'$, $f^3$, $f^2$, $d^3$, $d^2$, and $f'$, driving the piston in the direction of the arrow 1 until communication with chamber $f^4$ is cut off by the contact of the points $h^3$ and $i^3$, which brings the piston into the same relation to its interior measuring-chamber, $f^4$, as is shown in Fig. 2 in relation to chamber $f'$. The piston now moves around the projection $c'$ in the same manner, as has just been described in relation to the case-projection point $c^2$, and so on in succession. The movements of the piston are communicated through the crank-shaft $l$ to crank-shaft $m$, and this drives the registering mechanism contained in the box F. I have shown the piston and case as having four acting points and recesses; but I may use any desired number of points and recesses. By reversing the flow the meter will operate in the direction opposite to that shown by the arrows and described. The piston has a crank-connection with the case and the indicating mechanism, as shown in Fig. 1, and it will be understood that such connection of the crank with the case controls the piston in such manner as to hold it in contact with the case bearing-surfaces at every point in its revolution, for the purpose of dividing the case-chambers and the piston-recesses into enlarging and contracting spaces. The crank having a fixed relation to the piston and to the case forces the piston to describe a circle which keeps its bearing-surfaces in contact with the bearing-surfaces of the case, and the outflow must necessarily be registered.

I claim—

1. The combination, in a water-meter, of a revolving non-rotating piston having the bearing-points $h\,h'$, &c., and recesses $f'\,f^2$, &c., with a case having an equal number of coacting bearing-points and corresponding recesses, and the inlet and exhaust ports $a$ and $b$, bounded by and having the edges $k\,k$ and $i\,i'$, &c., whereby the piston-points are caused to open communication between the measuring-spaces the instant communication is closed with the inlet-ports $a$, to effect the free inlet and discharge of the water into and from the measuring-spaces, substantially as described.

2. In a water-meter, the combination of a revolving non-rotating piston having projections formed with bearing-points $h\,h'$, &c., connected by a convex surface, $e'$, &c., and having the concave bearing-surfaces $r$, with a case having an equal number of projections having coacting bearing-points $i\,i'$, &c., connected by the convex bearing-surface $n$, case-recesses corresponding to the convex formation of the piston projections $e'$, and suitable inlet and exhaust ports, substantially as described.

3. In a water-meter, the combination of a revolving non-rotating piston having projections formed with bearing-points $h\,h'$, &c., connected by a convex surface, $e'$, &c., and having concave bearing-surfaces $r$, with a case having an equal number of projections having coacting bearing-points $i\,i'$, connected by the convex bearing-surfaces $n$, and inlet and exhaust ports $a$ and $b$, bounded by and having the edges $k\,k$ and $i\,i'$, &c., and the case-recesses corresponding to the convex formation of the piston projections $e'$, &c., substantially as herein set forth.

4. The combination of a revolving non-rotating piston having bearing projections $h\,h'$, &c., and $e\,e'$, &c., and concave bearing-surfaces $r$, with a case having bearing projections $i\,i'$, &c., $n$, and $k\,k$, the inlet and exhaust ports $a$ and $b$, the inlet bottom passage, H, communicating with the ports $a$, and the outlet top passage, E, communicating with the ports $b$, substantially as herein set forth.

In testimony whereof I have hereunto set my hand in the presence of two subscribing witnesses.

LEWIS HALLOCK NASH.

Witnesses:
A. E. H. JOHNSON,
J. W. HAMILTON JOHNSON.